US010690777B2

(12) United States Patent
Overbeck

(10) Patent No.: US 10,690,777 B2
(45) Date of Patent: Jun. 23, 2020

(54) MULTI-ANTENNA-GNSS RECEIVER-SYSTEM TO RAISE THE PROBABILITY OF LINE OF SIGHT

(71) Applicant: Fraunhofer-Gesellschaft zur Foerderung der angewandten Forschung e.V., Munich (DE)

(72) Inventor: Matthias Overbeck, Pegnitz (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/813,296

(22) Filed: Jul. 30, 2015

(65) Prior Publication Data
US 2016/0033648 A1    Feb. 4, 2016

(30) Foreign Application Priority Data
Jul. 31, 2014    (EP) .................................... 14179396

(51) Int. Cl.
*G01S 19/24*    (2010.01)
*G01S 19/42*    (2010.01)
(Continued)

(52) U.S. Cl.
CPC .............. *G01S 19/24* (2013.01); *G01S 19/07* (2013.01); *G01S 19/35* (2013.01); *G01S 19/42* (2013.01); *G01S 19/421* (2013.01)

(58) Field of Classification Search
CPC .......... G01S 19/01; G01S 19/03; G01S 19/14; G01S 19/24; G01S 19/35; G01S 19/36;
(Continued)

(56) References Cited

U.S. PATENT DOCUMENTS 5,341,301 A    8/1994   Shirai et al.
5,359,521 A *  10/1994  Kyrtsos .................. G01S 19/41
                                                    340/988
(Continued)

FOREIGN PATENT DOCUMENTS

CN    2478119 Y    2/2002

OTHER PUBLICATIONS

Abel, "The Existence and Uniqueness of GPS Solutions," (Nov. 1991), IEEE Transactions on Aerospace and Electronics Systems, vol. 27, No. 6, pp. 952-956 (Year: 1991).*
(Continued)

*Primary Examiner* — Harry K Liu
(74) *Attorney, Agent, or Firm* — Keating & Bennett, LLP

(57) ABSTRACT

A system having two or more antenna-receiver combinations is provided, wherein each of the two or more antenna-receiver combinations has an antenna and a receiver. Furthermore, the system has a position determiner for determining a position of the system. Each antenna-receiver combination is configured to receive time information from each satellite of three or more satellites, if the antenna of said antenna-receiver combination has a line of sight to said satellite. The position determiner is configured to determine said position of the system depending on a satellite position of each of the three or more satellites, and depending on the time information from each of the three or more satellites provided by one or more of the two or more antenna-receiver combinations, if, for each of the three or more satellites, the position determiner receives time information of said satellite from at least one of the two or more antenna-receiver combinations.

15 Claims, 5 Drawing Sheets

(51) Int. Cl.
*G01S 19/35* (2010.01)
*G01S 19/07* (2010.01)

(58) Field of Classification Search
CPC ...... G01S 19/42; G01S 19/421; G01S 19/423;
G01S 19/425; G01S 19/45; G01S 19/49;
G01S 19/04; G01S 19/09; G01S 19/10;
G01S 19/11; G01S 19/22; G01S 19/25;
G01S 19/256; G01S 19/07; G01S 19/28;
H04B 1/7073; H04B 1/7075
USPC .................................................. 342/357.25
See application file for complete search history.

(56) References Cited

U.S. PATENT DOCUMENTS

| | | | | |
|---|---|---|---|---|
| 5,899,957 A * | 5/1999 | Loomis | ................... | G01S 19/04 340/988 |
| 6,281,841 B1 * | 8/2001 | Nevill | ....................... | F41G 3/04 342/357.59 |
| 8,686,900 B2 * | 4/2014 | Whitehead | ........... | A01B 69/008 342/357.27 |
| 2002/0033766 A1 * | 3/2002 | Pratt | ....................... | G01S 19/21 342/357.63 |
| 2005/0143872 A1 * | 6/2005 | Barazzetti | ............... | G01S 19/55 701/4 |
| 2005/0197755 A1 | 9/2005 | Knowlton et al. | | |
| 2006/0125689 A1 * | 6/2006 | Narayan | ................. | G01S 19/21 342/381 |
| 2007/0159385 A1 * | 7/2007 | Lawrence | ............... | G01S 19/32 342/357.36 |
| 2007/0241960 A1 * | 10/2007 | Feller | ...................... | G01S 19/05 342/357.27 |
| 2008/0112468 A1 * | 5/2008 | Sheynblat | ................ | H01Q 3/24 375/148 |
| 2008/0180315 A1 * | 7/2008 | Tarlow | .................... | G01S 19/42 342/357.25 |
| 2009/0243923 A1 * | 10/2009 | Heraud | ................... | G01S 19/35 342/357.48 |
| 2010/0149032 A1 * | 6/2010 | Feller et al. | ............ | G01S 19/05 342/357.43 |
| 2010/0211248 A1 * | 8/2010 | Craig | .................... | B60W 30/02 701/31.4 |
| 2012/0259478 A1 * | 10/2012 | Schuerman | ............ | G01C 21/26 701/1 |
| 2014/0091966 A1 | 4/2014 | Martin et al. | | |

OTHER PUBLICATIONS

Official Communication issued in corresponding European Patent Application No. 15179056.5, dated Dec. 6, 2015.
Pany, T. et al., "Concept of Synthetic Aperture GNSS Signal Processing Under Canopy", Proceedings of ENC-GNSS 2013, The European Navigation Conference, Apr. 23-25, 2013, 11 pages.
Sauter, U., "Real-Time Navigation and RFID Labeling", 16th Convention, Clouds Above the Forests?, IT Tools for the Forests, Optimizing the Logistic Chain for Round Wood Provision, Jun. 13, 2012, 26 pages.

* cited by examiner

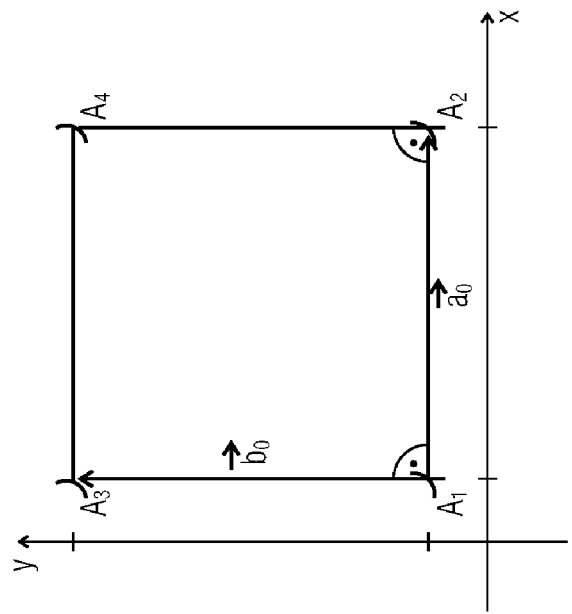
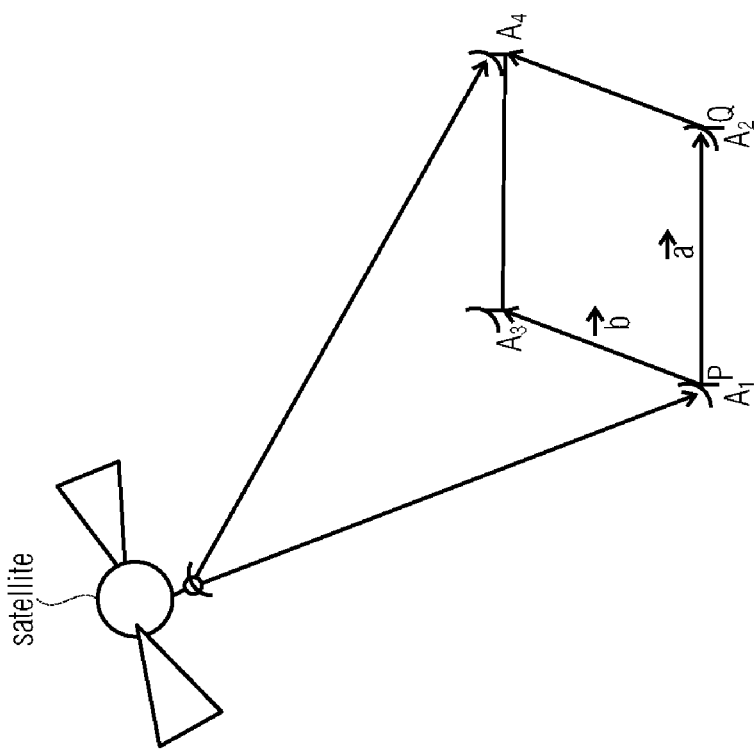
FIG. 5

MULTI-ANTENNA-GNSS RECEIVER-SYSTEM TO RAISE THE PROBABILITY OF LINE OF SIGHT

CROSS-REFERENCE TO RELATED APPLICATION

This application claims priority from European Application No. 14179396.8, which was filed on Jul. 31, 2014, and is incorporated herein by reference in its entirety.

BACKGROUND OF THE INVENTION

The present invention relates to a satellite navigation receiver system, and, in particular, to a multi-antenna-GNSS receiver system to raise the probability of line of sight (GNSS=Global Navigation Satellite System).

In difficult Global Navigation Satellite System scenarios, where satellite signals are shadowed by obstacles around the receiver, the receiver is not able to continuously track all signals of available satellites.

The known technology provides some attempts to solve this problem.

In "Concept of Synthetic Aperture GNSS Signal Processing Under Canopy" (see [1]), it is proposed for difficult scenarios to raise the received satellite signal power by a synthetic aperture radar.

In multi-antenna phased-array receivers, GNSS signals from different spatial locations are combined coherently forming an optimized synthetic antenna-gain pattern. Thereby, multipath signals can be rejected and the line of sight received signal power is maximized.

Both solutions have commonly the same problem that the distance of the antenna phase centre must be quite short, so no new sky view around obstacles is expected.

In CN2478119 (Y) (see [2]), a GPS multi-antenna switch (GPS=Global Positioning System) is described to reduce receiver hardware cost by using a single receiver with multiple antennas for dam deformation monitoring. With this technology only small movements can be detected. The provided multi-antenna switch is therefore not suitable for dynamic applications.

In Sauter (see [3]), it is described that in a deep forest environment, no position solution with an accuracy of below one meter can be gained with GNSS.

SUMMARY

According to an embodiment, a system may have: two or more antenna-receiver combinations, wherein each of the two or more antenna-receiver combinations has an antenna and a receiver, and a position determiner for determining a position of the system, wherein each antenna-receiver combination of the two or more antenna-receiver combinations is configured to receive time information from each satellite of three or more satellites, if the antenna of said antenna-receiver combination has a line of sight to said satellite, and wherein the position determiner is configured to determine said position of the system depending on a satellite position of each of the three or more satellites, and depending on the time information from each of the three or more satellites received by one or more of the two or more antenna-receiver combinations, if, for each of the three or more satellites, the position determiner receives the time information of said satellite from at least one of the two or more antenna-receiver combinations In embodiments, the antennas of the two or more antenna-receiver combinations are, e.g., spaced apart from each other.

According to an embodiment, a distance between each pair of two antennas of the antennas of the two or more antenna-receiver combinations may, e.g., be greater than 50 centimeters.

In an embodiment, the system may, e.g., have at least three antenna-receiver combinations.

According to an embodiment, the three or more satellites may, e.g., be satellites of a global navigation satellite system.

In an embodiment, each antenna-receiver combination of the two or more antenna-receiver combinations may, e.g., be configured to receive time information from each satellite of four or more satellites, if the antenna of said antenna-receiver combination has a line of sight to said satellite.

According to an embodiment, the position determiner may, e.g., be configured to determine said position of the system by selecting, for each satellite of the three or more satellites, if more than one antenna-receiver combination provides time information from said satellite to the position determiner, the time information from said satellite provided by one of the more than one antenna-receiver combinations to the position determiner, that was comprised within a received satellite signal having a greatest signal energy among all received satellite signals which have the time information from said satellite received by the receivers of the two or more antenna-receiver combinations.

In an embodiment, the position determiner may, e.g., be configured to determine said position of the system depending on a reception time of the time information of each of the three or more satellites received by one or more of the two or more antenna-receiver combinations, wherein said reception time indicates when said time information was received by said antenna-receiver combination or when said time information was received by the position determiner from said antenna-receiver combination.

In an embodiment, the position determiner may, e.g., be configured to determine said position of the system without correcting the reception time of the time information of each of the three or more satellites received by one or more of the two or more antenna-receiver combinations.

According to another embodiment, the position determiner may, e.g., be configured to determine said position of the system by correcting a reception time of the time information of each of the three or more satellites received by one or more of the two or more antenna-receiver combinations In an embodiment, the position determiner may, e.g., be configured to correct said reception time by using a geometry between the antennas of the two or more antenna-receiver combinations, or by using the antennas of the two or more antenna-receiver combinations with a position fix, or by using additionally an inertial navigation system and magnetic field sensors.

According to an embodiment, the receiver of each antenna-receiver combination of the two or more antenna-receiver combinations may, e.g., be configured to provide information about tracking parameters for carrier and code loops for one or more satellites of the three or more satellites to at least one other antenna-receiver combination of the two or more antenna-receiver combinations.

In an embodiment, the position of the system to be determined by the position determiner is a system position. The receiver of said antenna-receiver combination may, e.g., be configured to transform said information about the tracking parameters for the carrier and the code loops for said one or more satellites geometrically to an antenna position of the antennas of said at least one other antenna-receiver combination. Moreover, the receivers of said at least one other antenna-receiver combination may, e.g., be configured to use said information about the tracking parameters for the carrier and the code loops for a deep coupling of the tracking loops of said receiver of said at least one other antenna-receiver combination.

Another embodiment may have a motor vehicle, having the system as mentioned above.

According to an embodiment, the motor vehicle, may, e.g., be a harvester.

According to another embodiment, a method, wherein each of two or more antenna-receiver combinations has an antenna and a receiver, may have the steps of: receiving time information from each satellite of three or more satellites by each antenna-receiver combination of the two or more antenna-receiver combinations, if the antenna of said antenna-receiver combination has a line of sight to said satellite; and determining said position of the system by the position determiner depending on a satellite position of each of the three or more satellites, and depending on the time information from each of the three or more satellites provided by one or more of the two or more antenna-receiver combinations, if, for each of the three or more satellites, the position determiner receives the time information of said satellite from at least one of the two or more antenna-receiver combinations.

Another embodiment may have a computer program for implementing the above-described method when being executed on a computer or signal processor.

BRIEF DESCRIPTION OF THE DRAWINGS

In the following, embodiments of the present invention are described in more detail with reference to the figures, in which:

FIG. 5 illustrates an orthogonal setup with four antennas according to an embodiment.

DETAILED DESCRIPTION OF THE INVENTION

Figure 1:
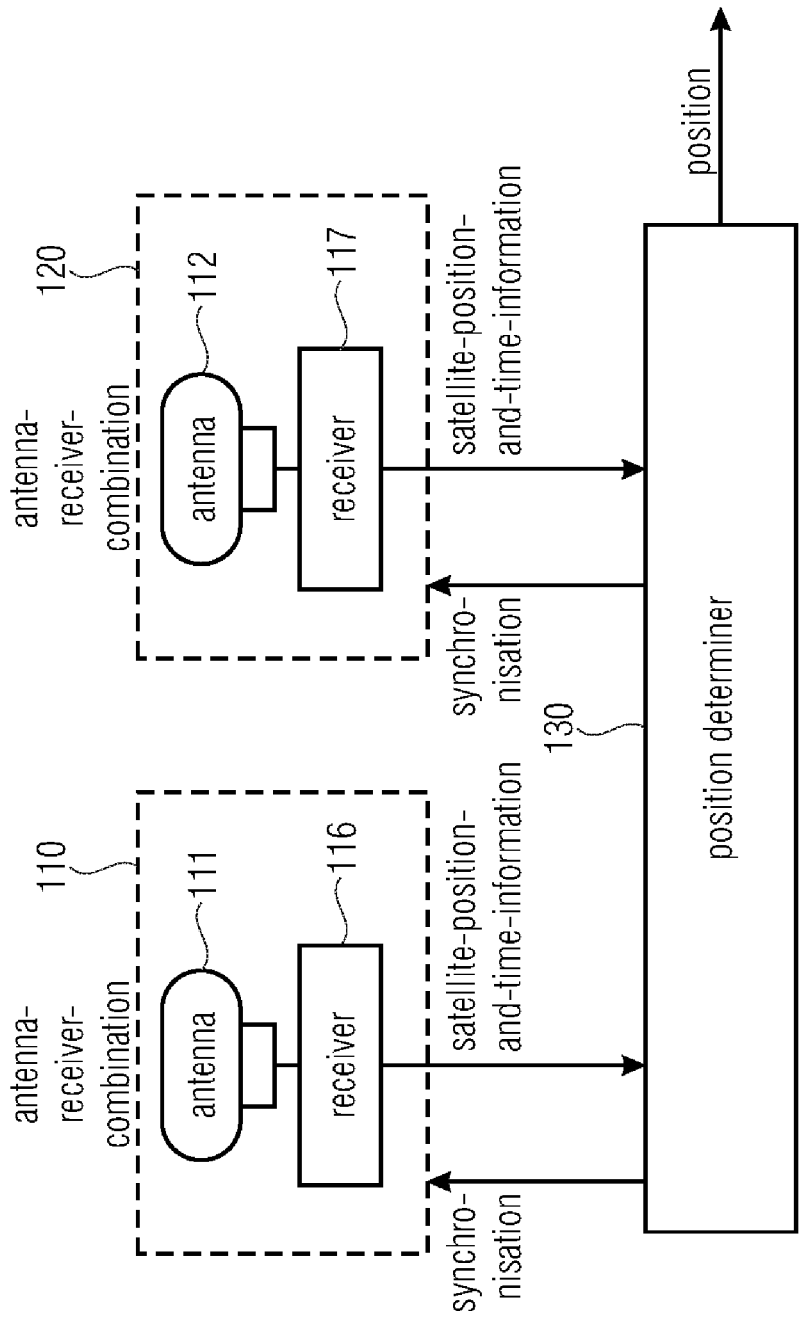
FIG. 1 is an apparatus according to an embodiment.

FIG. 1 illustrates a system according to an embodiment.

The system comprises two or more antenna-receiver combinations 110, 120. Each of the two or more antenna-receiver combinations 110, 120 comprises an antenna 111, 112 and a receiver 116, 117. The receivers may, e.g., be phase stable synchronized by a base reference clock to guarantee that the reception time difference to a single satellite between to antenna-receiver combinations is only introduced by the different position of the antenna phase center and multipath effects.

Furthermore, the system comprises a position determiner 130 for determining a position of the system.

Each antenna-receiver combination 110, 120 of the two or more antenna-receiver combinations 110, 120 is configured to receive time information from each satellite of three or more satellites, if the antenna 111, 112 of said antenna-receiver combination 110, 120 has a line of sight to said satellite.

The position determiner 130 is configured to determine said position of the system depending on a satellite position of each of the three or more satellites, and depending on the time information from each of the three or more satellites provided by one or more of the two or more antenna-receiver combinations 110, 120, if, for each of the three or more satellites, the position determiner 130 receives the time information of said satellite from at least one of the two or more antenna-receiver combinations 110, 120.

In embodiments, the antennas 111, 112 of the two or more antenna-receiver combinations 110, 120 are spaced apart from each other.

In some embodiments, the position of a satellite may, in some global navigation satellite systems, be provided by the satellite itself. Or, in other embodiments, the position of a satellite at a certain point in time may, e.g., be available at the receiver, for example, in a look-up table. Or, in other embodiments, the position of a satellite at a certain point in time may, for example, be available in the internet.

Time information from a satellite may, for example, be a time stamp in a signal that indicates, for example, by using a global satellite time, when the signal portion comprising the time stamp is sent from the satellite.

The determination of the position of the system depends on the position of the satellite and depends on the time information from the satellite. In embodiments, the dependency on the time information from the satellite covers a dependency on what is indicated by the time information (e.g., what sent time is indicated, e.g., by a time stamp, e.g., indicating a global satellite system time) and a dependency on when the time information from the satellite is received (e.g., when was the time information received).

In some embodiments, the time information from the satellite may, e.g., be (e.g., immediately) passed from one of the antenna-receiver combinations 110, 120 to the position determiner 130, and the time of reception of the time information from the satellite by the position determiner 130 may, e.g., be taken into account for determining the position of the system. In embodiments, where the position determiner 130 itself determines a reception time, this ensures that for all time information from satellites received by different antenna-receiver combinations, the same clock (e.g., a clock of the position determiner) is used to determine the reception time.

In other embodiments, a time of reception of the time information by the respective antenna-receiver combination 110, 120 is employed as a reception time. In such embodiments, the system may, e.g., comprise a system clock which provides a system time to each of the two or more antenna-receiver combinations, and that system time is used to determine a reception time when time information from a satellite arrives at each of the two or more antenna-receiver combinations 110, 120.

In the art of global navigation satellite systems, for example in GPS, it is well-known how to determine a position of a system, by receiving time information from all satellites necessitated at a single antenna, by determining a reception time of that time information, and by determining the position of the system depending on the time information (e.g., a received time stamp indicating a satellite system time), depending on the reception time of the time information and depending on the positions of the satellites necessitated. The present invention provides a system that comprises more than one antenna. According to embodiments of the present inventions, if a first antenna does not receive the time information from all satellites necessitated, a second antenna may receive the time information from the remaining satellites that are necessitated.

Embodiments are based on the finding that by employing more than one antenna, the robustness of position determination of the system is increased. If a first antenna 111 has no line of sight to a first satellite, there is a chance that the second antenna 112, being positioned at a different position than the first antenna, has a line of sight to said first satellite. The second antenna 112 may, however, itself, have obstacles in its way to a second satellite. Now, the first antenna 111, however, may, e.g., have a line of sight to said second satellite, and so, the first antenna 111 and the second antenna 112 complement each other. Employing more than two antennas at further positions increases the robustness of position estimation even further.

In embodiments, if the antenna 111, 112 of an antenna-receiver combination 110, 120 has a line of sight to said satellite:

said antenna-receiver combination 110, 120 is configured to receive time information from each satellite of three or more satellites, and said antenna-receiver combination 110, 120 is configured to provide said time information to the position determiner 130.

Some embodiments use multiple antennas with multiple synchronized GNSS receivers and use the spatial distance of the antenna to achieve multiple sights to the sky and to gain with at least one antenna a line of sight to each available GNSS satellite.

The uncorrected raw data (pseudo range and carrier phase) of each antenna-receiver combination 110, 120 is used to calculate a combined position of the antenna system. This can be done as the geometry between the used antennas is known and the bearing can either be gained by using at least three antennas with a position fix or by using additionally or alternatively INS and/or magnetic field sensors (INS=Inertial Navigation System).

In an embodiment, the system may, e.g., comprise at least three antenna-receiver combinations 110, 120.

Figure 2:
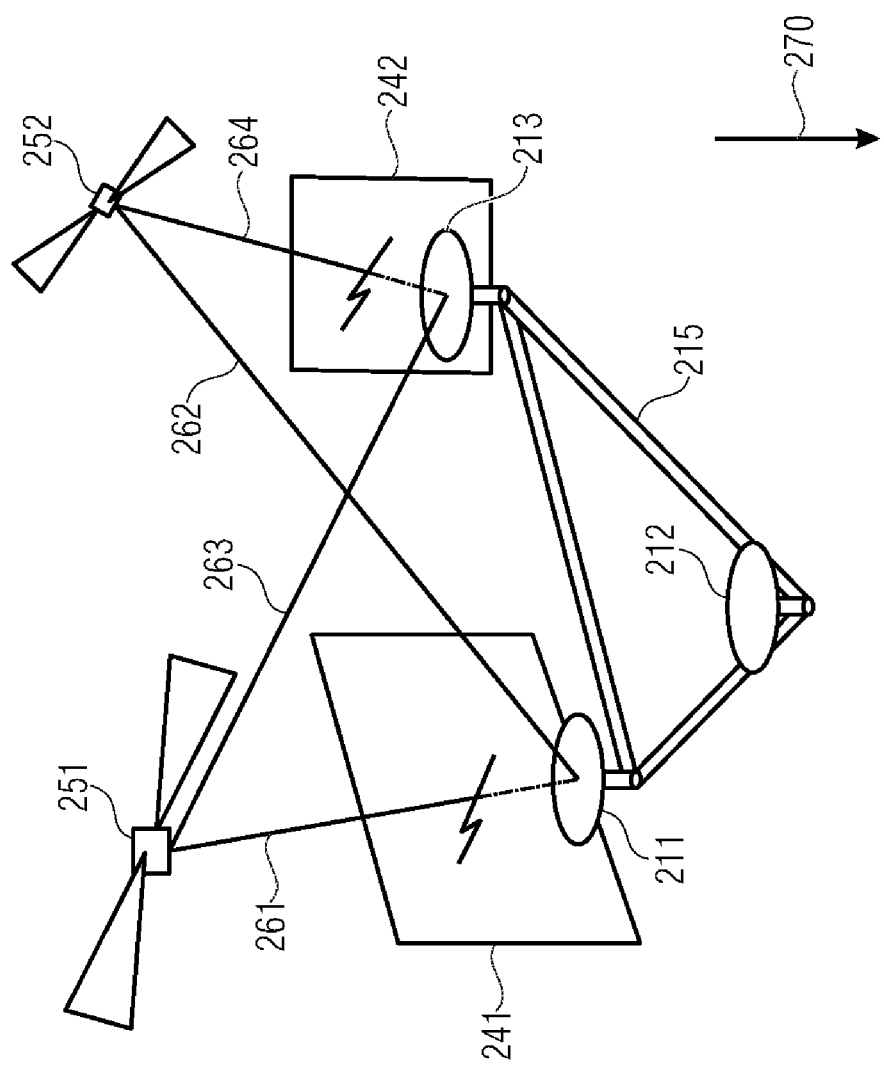
FIG. 2 illustrates a setoff of a system according to an embodiment.

FIG. 2 illustrates a principle setup and functionality of a system according to embodiments. Three antennas 211, 212, 213 are depicted. Each of the three antennas 211, 212, 213 is an antenna of an individual antenna-receiver combination of three antenna-receiver combinations (not shown in FIG. 2). The position determiner of the above-described system and the receivers of the antenna-receiver combinations are also not depicted in FIG. 2.

In. FIG. 2, the antennas 211, 212, 213 are mounted on a carrier 215. Two satellites 251 and 252 are depicted. Moreover, two obstacles 241, 242 are illustrated.

In FIG. 2, antenna 211 has a line of sight 262 to satellite 252. Satellite 252 can therefore receive time information from satellite 252. However, antenna 211 has no line of sight 261 to satellite 251, as the obstacle 241 disturbs the sight. Therefore, satellite 252 cannot receive time information from satellite 251.

According to an embodiment, the inventive system comprises not only the antenna 211, but also the antennas 212, 213. The antenna 213 itself has a line of sight 263 to the satellite 251, as this line of sight 263 is not disturbed by one of the obstacles 241, 242. Therefore, the antenna 213 can receive the time information from the satellite 251 and thus, this time information is available for the system. Thus, the time information from the satellite 251, as well as the time information from the satellite 252 is available for the system, although, some line of sights from one of the antennas to one of the satellites do not exist, as an obstacle 241, 242 is in the way. (For example, the antenna 213 has also no line of sight 264 to the satellite 252, as the obstacle 242 is in the way.)

Using only the antenna-receiver combination with the antenna 211, for position calculation, the first satellite 251 is not in view, as it is shadowed by obstacle 241. The antenna 213 however has a clear line of sight to the first satellite 251.

According to an embodiment, a distance between each pair of two antennas 111, 112 of the antennas 111, 112 of the two or more antenna-receiver combinations 110, 120 may, e.g., be greater than 50 centimeters.

According to an embodiment, the three or more satellites may, e.g., be satellites of a global navigation satellite system.

Returning to FIG. 1, in an embodiment, the time information from four or more satellites is taken into account. Each antenna-receiver combination 110, 120 of the two or more antenna-receiver combinations 110, 120 may, e.g., be configured to receive time information from each satellite of four or more satellites, and to pass said time information to the position determiner 130, if the antenna 111, 112 of said antenna-receiver combination 110, 120 has a line of sight to said satellite. A satellite system well-known in the art, where time information from four or more satellites are taken into account is GPS (Global Positioning System).

Other satellite systems, for which the system as described above or below may be employed, is the European GALILEO satellite system or the Russian GLONASS satellite system.

The position determiner 130 of FIG. 1 may, e.g., proceed as follows. If the time information from all satellites necessitated is received from only one of the satellite-receiver combinations, then the position determiner may conduct position determination based on this data.

Position determination based on time information from four or more satellites and received by a single antenna is well-known in the conventional technology, as for example, disclosed with respect to the Global Positioning System (GPS).

Moreover, position determination based on time information from three satellites and received by a single antenna is also well-known in the conventional technology, when a limiting assumption to the position of the system, for example, with respect to the height of the system, is made. For example, it may be assumed that the system is located at a height of 50 m above sea-level; for example, by introducing a limiting assumption regarding the position of the system, time information from exactly three satellites becomes sufficient to determine the position of the system in the three-dimensional world; instead of the height of the system, another assumption on the position of the system may, e.g., be introduced.

Assuming that time information from three satellites is sufficient, in some embodiments, the position determiner may, e.g., proceed as follows:

(a) If only one antenna-receiver combination receives time information from at least three of the satellites, only the time information from the at least three of the satellites from this antenna-receiver combination may be employed.

(b) If more than one antenna-receiver combination receives time information from at least three of the satellites, one of these more than one antenna-receiver combinations is selected, and only the time information from the at least three of the satellites from the selected antenna-receiver combination may be employed. The selection of one of those antenna-receiver combinations may, e.g., be conducted randomly or pseudo-randomly.
(c) If none of the antenna-receiver combinations receive time information from at least three of the satellites, then:
For each of the satellites for which the position determiner received time information:
   (c1) If only one of the antenna-receiver combinations provides time information from said satellite to the position determiner, use this time information.
   (c2) If more than one of the antenna-receiver combinations provide time information from said satellite to the position determiner, select the time information provided by one of the antenna-receiver combinations which provided time information from said satellite. The selection of one of those antenna-receiver combinations may, e.g., be conducted randomly or pseudo-randomly. Or, that antenna-receiver combination may, e.g., be selected which received the time information in a received satellite signal that has the strongest signal energy among the received satellite signals of the antenna-receiver combinations, which comprise time information from said satellite.

In other embodiments, the position determiner 130, may, for example, not apply the steps (a) and (b) but may, e.g., only apply step (c) and its substeps (c1) and (c2).

So, according to an embodiment, the position determiner 130 may, e.g., be configured to determine said position of the system by selecting, for each satellite 251, 252 of the three or more satellites 251, 252, if more than one antenna-receiver combination 110, 120 provides time information from said satellite to the position determiner 130, the time information from said satellite 251, 252 provided by one of the more than one antenna-receiver combinations 110, 120 to the position determiner 130, that was comprised within a received satellite signal having a greatest signal energy among all received satellite signals which comprise the time information from said satellite 251, 252 received by the receivers 116, 117 of the two or more antenna-receiver combinations 110, 120.

In other embodiments, analogous rules apply, if at least four satellites are necessitated for position estimation:
(a') If only one antenna-receiver combination receives time information from at least four of the satellites, only the time information from the at least four of the satellites from this antenna-receiver combination may be employed.
(b') If more than one antenna-receiver combination receives time information from at least four of the satellites, one of these more than one antenna-receiver combinations is selected, and only the time information from the at least four of the satellites from the selected antenna-receiver combination may be employed. The selection of one of those antenna-receiver combinations may, e.g., be conducted randomly or pseudo-randomly.
(c') If none of the antenna-receiver combinations receive time information from at least four of the satellites, then:
For each of the satellites for which the position determiner received time information:
   (c1') If only one of the antenna-receiver combinations provides time information from said satellite to the position determiner, use this time information.
   (c2') If more than one of the antenna-receiver combinations provide time information from said satellite to the position determiner, select the time information provided by one of the antenna-receiver combinations which provided time information from said satellite. The selection of one of those antenna-receiver combinations may, e.g., be conducted randomly or pseudo-randomly. Or, that antenna-receiver combination may, e.g., be selected which received the time information in a received satellite signal that has the strongest signal energy among the received satellite signals of the antenna-receiver combinations, which comprise time information from said satellite.

Again, in other embodiments, the position determiner 130, may, for example, not apply the steps (a') and (b') but may, e.g., only apply step (c') and its substeps (c1') and (c2').

As already described above, in embodiments, the position determiner 130 may, e.g., be configured to determine said position of the system depending on a reception time of the time information of each of the three or more satellites 251, 252 received by one or more of the two or more antenna-receiver combinations 110, 120, wherein said reception time indicates when said time information was received by said antenna-receiver combination 110, 120 or when said time information was received by the position determiner 130 from said antenna-receiver combination 130.

If only time information from the three or more satellites is received from an antenna of a single antenna-receiver combination, then position determination of the system is well-known in the art. for example, from GPS or other global navigation satellite systems.

If, however, a first time information from one or more first satellites is received by a first antenna 111 of a first antenna-receiver combination 110 and if second time information from one or more second satellites is received by a second (or also a third or more) antenna 112 of a second (or also a third or more) antenna-receiver combination 120, which is spaced apart from the first antenna 111 of the first antenna-receiver combination 110, then different embodiments may, e.g., apply different strategies:

One strategy that is applied by some embodiments is to ignore that the time information from the three or more satellites has been received by different antennas 111, 112 being spaced apart from each other. This strategy may be considered reasonable, in particular, when the distance between each antenna pair of the antennas of the antenna-receiver combinations is not too large, for example, if the distance between two antennas is smaller than three metres.

That the time information from different satellites, received by different antennas at different locations, is processed as if it would have been received by a single antenna will introduce a slight error in the position determination. The arising error may, e.g., be caused by that in the processing, a first reception time of first time information that is received at the first antenna 111 and a second reception time of second time information that is received at the second antenna 112 is treated, as if both the first and the second time information would have arrived at the same antenna. However, if the distances between the antennas are not too large, the introduced error may remain small.

So, in such an embodiment, the position determiner may, e.g., be configured to determine said position of the system without correcting the reception time of the time information of each of the three or more satellites 251, 252 received by one or more of the two or more antenna-receiver combinations 110, 120.

Position determination by the position determiner 130 is then conducted as disclosed in the known technology, for example, as disclosed with respect to GPS or other global navigation satellite systems.

According to other embodiments, the position determiner 130 may, e.g., be configured to determine said position of the system by correcting a reception time of the time information of each of the three or more satellites 251, 252 received by one or more of the two or more antenna-receiver combinations 110, 120.

For example, as in FIG. 2, if the antenna 211 receives a first time information from the satellite 252, and if the antenna 213 receives a second time information from the satellite 251, then, the reception time of the time information from the satellite 251 may, e.g., be corrected to compensate, that the antenna 213 is located at a position being different from the position of the antenna 211, and so to compensate that the signal from the satellite 251 may arrive later at the antenna 213 than it would have arrived at the antenna 211 (if the obstacle 241 would not have been in the way).

Whether a signal of a satellite receives earlier or later at a second antenna than at a first antenna depends on the position of the satellite and further depends on the position and orientation of the system. The orientation of the system may, e.g., be defined by the geometry of the system, e.g., by how the antennas are arranged in the system and how this arrangement is oriented with respect to a reference, e.g., with respect to the north pole of the earth, with respect to the south pole or the earth or with respect to another reference.

For example, if in FIG. 2, if arrow 270 points to the north pole of earth, then the system of FIG. 2 is arranged so that antenna 211 is located east of the antennas 212 and 213, antenna 212 is located north of the antennas 211 and 213 and the antenna 213 is located west of the antennas 211 and 212.

Moreover, as the satellite 251 is located east of the eastern antenna 211 and east of the western antenna 213, it can be concluded that (without considering the depicted obstacles 241, 242 in FIG. 2, which disturb the line of sight), a signal from the satellite 251 will arrive earlier at the eastern antenna 211 than at the western antenna 213. The time of arrival differences between both antennas may, e.g., depend on the speed of light, the distance between the antenna 211 and the satellite 251 and the distance between the antenna 213 and the satellite 251. The distances necessitated may, e.g., be calculated by applying trigonometric functions.

In an embodiment, the position determiner 130 may, e.g., be configured to correct the reception time of the time information of each of the three or more satellites 251, 252 received by said one or more of the two or more antenna-receiver combinations 110, 120 by using a geometry between the antennas 111, 112; 211, 212, 213; 411, 412, 413 of the two or more antenna-receiver combinations 110, 120, or by using the antennas 111, 112; 211, 212, 213; 411, 412, 413 of the two or more antenna-receiver combinations 110, 120 with a position fix, or by using additionally an inertial navigation system and magnetic field sensors.

By having a position fix for e.g. three antennas a fourth antenna position would be completely determined and virtual reception times and tracking parameters could be calculated.

E.g. in an orthogonal setup with four antennas as shown in FIG. 5:

$$\vec{a} = A_2 - A_1$$

$$\vec{b} = A_3 - A_1$$

$$A_4 = \vec{a} + \vec{b}$$

where as $A_1, A_2, A_3, A_4$ are the positions of the phase centres of the antennas and a is the vector from $A_1$ to $A_2$ and $\vec{b}$ is the vector from $A_1$ to $A_3$ and $A_4$ is the calculated antenna position.

With less antennas more unknowns are given so the position and direction of the carrier could be determined by inertial and magnetic sensors or from the terrain of a precise map.

By knowing the geometry and the motion of the carrier 215, the receivers of the antenna-receiver combinations can support each other by giving information about tracking parameters for carrier and code loops for obstructed satellites of the receivers of the other antenna-receiver combinations. This information is transformed geometrically to the other receiver's antenna position and used for a deeply coupling of the tracking loops of it. A common bearing and position can be calculated by using the inter receiver relation and processing ranges and carrier phases of each receiver.

So, according to an embodiment, the receiver 116, 117 of each antenna-receiver combination 110, 120 of the two or more antenna-receiver combinations 110, 120 may, e.g., be configured to provide information about tracking parameters for carrier and code loops for one or more satellites of the three or more satellites to at least one other antenna-receiver combination 110, 120 of the two or more antenna-receiver combinations 110, 120.

Furthermore, in an embodiment, the position of the system to be determined by the position determiner 130 is a system position. The receiver 116, 117 of said antenna-receiver combination 110, 120 may, e.g., be configured to transform said information about the tracking parameters for the carrier and the code loops for said one or more satellites geometrically to an antenna position of the antenna 111, 112 of said at least one other antenna-receiver combination 110, 120. Moreover, the receiver 116, 117 of said at least one other antenna-receiver combinations 110, 120 may, e.g., be configured to use said information about the tracking parameters for the carrier and the code loops for a deep coupling of the tracking loops of said receiver 116, 117 of said at least one other antenna-receiver combination 110, 120.

As satellites can be tracked by all receivers if only one of them has a line of sight connection the availability of a carrier phase solution is raised as more satellites stay visible with the proposed system. The disadvantages of shadowing like reacquisition and resolving of carrier ambiguities is essential reduced.

According to an embodiment, by a plurality of receivers, each of the receivers having associated an antenna, the antennas of the receivers being arranged in a predefined geometry on the harvester, a line of sight to the satellite shall be realized. By the known geometry between the receivers, the receivers can support each other in the process of tracking.

Embodiments of the present invention may be applied in different fields of application.

Especially in environments like a deep forest where the GNSS receiver is surrounded by high, narrow obstacles shadowing the satellite signal It is expected that this system could drastically raise the availability of line of sight to the satellites and therefore the availability of a carrier phase position solution.

According to embodiments, a motor vehicle is provided. The motor vehicle comprises the system according to one of the above-described embodiments.

According to an embodiment, the motor vehicle, may, e.g., be a harvester.

A harvester comprising a system according to an embodiment has particular advantages. As, in general, harvesters are designed to operate in forests, obstacles in the form of trees are numerous, but also, between the trees, the sky is often visible. So employing the above-described system on a roof or a side face of a harvester increases the chances of successful position estimation significantly.

Figure 3:
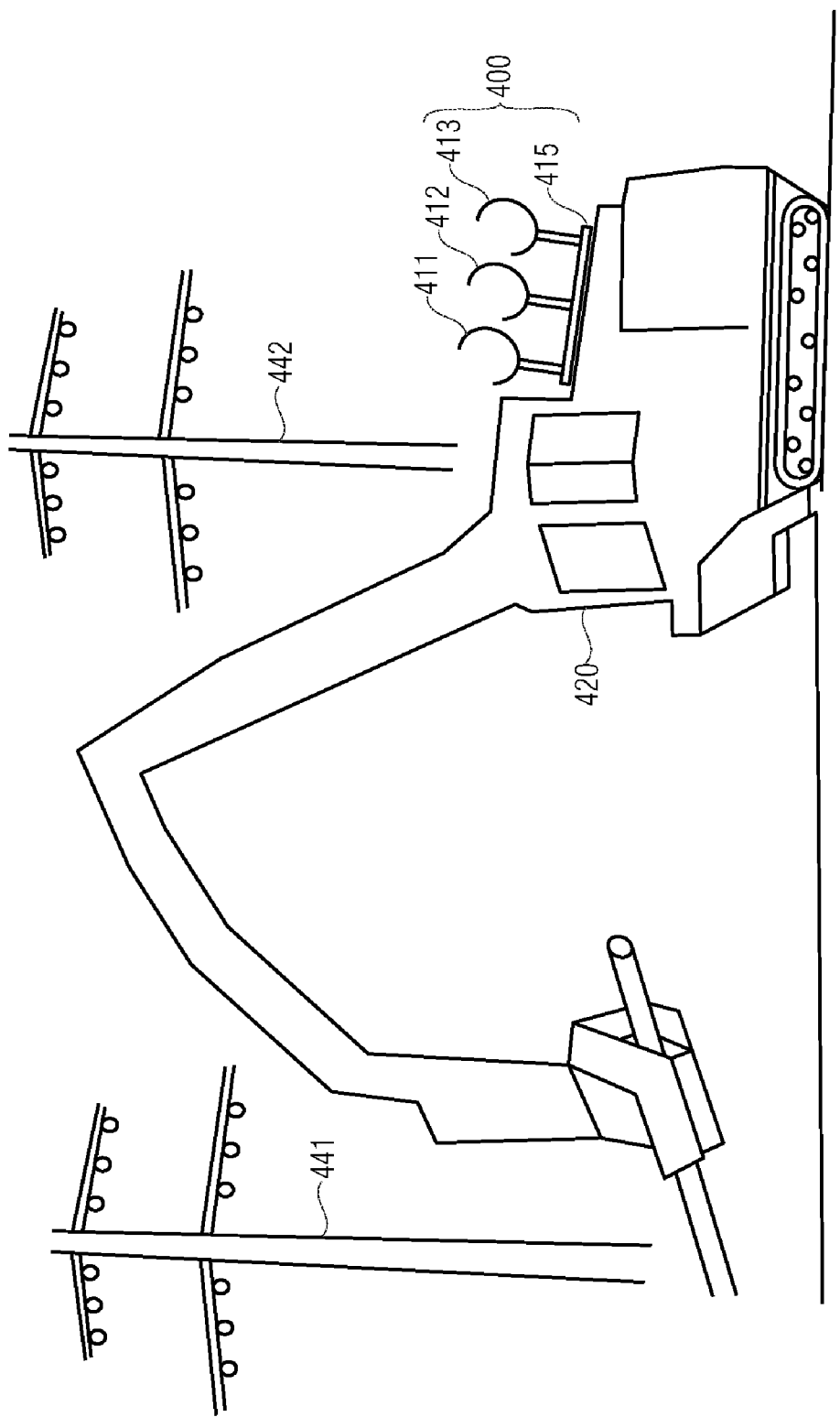
FIG. 3 illustrates a side view on a harvester according to an embodiment, wherein the harvester comprises a system according to an embodiment.

FIG. 3 illustrates a side view on a harvester 420 according to an embodiment, wherein the harvester 420 comprises a system according to an embodiment. The antennas 411, 412, 413 of the antenna-receiver combinations of the system 400 are illustrated. The antennas may, e.g., be mounted on a carrier 415. Trees 441, 442 of a forest represent obstacles.

Figure 4:
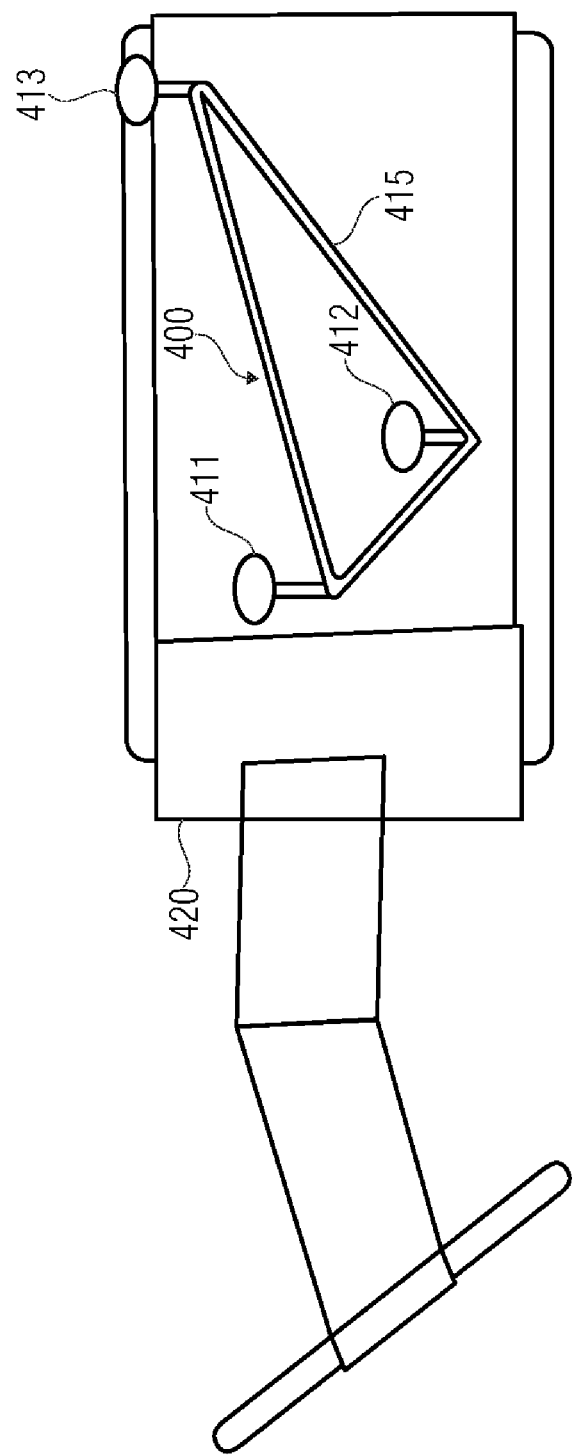
FIG. 4 illustrates a top view on the harvester of the embodiment of FIG. 3.

FIG. 4 illustrates a top view on the harvester 420 of the embodiment of FIG. 3.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] "Concept of Synthetic Aperture GNSS Signal Processing Under Canopy", by T. Pany, N. Falk, B. Riedl, C. Stöber, J. Winkel, and F.-J. Schimpl, Proceedings of ENC-GNSS 2013, the European Navigation Conference 2013, Vienna, Austria, Apr. 23-25, 2013.
[2] CN2478119 (Y), Feb. 20, 2002.
[3] "Optimierung der Logistikkette für die Rundholzbereitstellung Echtzeitnavigation and RFID-Kennzeichnung", Sauter, Udo Hans. 2012. Vortrag zur FowiTa. München, Bayern, Deutschland: s.n., 21. Sep. 2012.

The invention claimed is:

1. A system comprising:
two or more antenna-receiver combinations, wherein each of the two or more antenna-receiver combinations includes an antenna and a receiver, the receivers of the two or more antenna-receiver combinations being phase stable synchronized by a base reference clock, and
a position determiner that determines a position of the system, wherein
each antenna-receiver combination of the two or more antenna-receiver combinations is configured to determine a time of reception of time information from each satellite of the three or more satellites if the antenna of each of the two or more antenna-receiver combinations has a line of sight to each of the three or more satellites, and
the position determiner is configured to determine the position of the system if, for each of the three or more satellites, the position determiner receives the time information from each satellite from at least one of the two or more antenna-receiver combinations, depending on (i) a satellite position of each of the three or more satellites, (ii) how the antennas of the two or more antenna-receiver combinations are arranged in a predetermined geometry, (iii) the time information from each of the three or more satellites received by the at least one of the two or more antenna-receiver combinations, (iv) the time of reception of the time information from the satellite by the position determiner, and (v) the orientation of the system, the orientation depending on how the antennas are arranged in the system and how an arrangement of the antennas is oriented with respect to a reference.

2. The system according to claim 1, wherein a distance between each pair of antennas of the antennas of the two or more antenna-receiver combinations is greater than 50 centimeters.

3. The system according to claim 1, wherein the system comprises at least three antenna-receiver combinations.

4. The system according to claim 1, wherein each antenna-receiver combination of the two or more antenna-receiver combinations is configured to receive time information from each satellite of four or more satellites, if the one antenna of said antenna-receiver combination has the line of sight to said satellite.

5. The system according to claim 1, wherein the position determiner is configured to determine the position of the system by selecting, for each satellite of the three or more satellites, if at least two of the two or more antenna-receiver combinations provide time information to the position determiner, the time information provided by one of the at least two of the two or more antenna-receiver combinations to the position determiner that was included within a received satellite signal having a greatest signal energy among all received satellite signals which include the time information from each satellite received by the receivers of the two or more antenna-receiver combinations.

6. The system according to claim 1, wherein the position determiner is configured to determine said position of the system depending on a reception time of the time information of each of the three or more satellites received by one or more of the two or more antenna-receiver combinations, wherein said reception time indicates when said time information was received by said antenna-receiver combination or when said time information was received by the position determiner from said antenna-receiver combination.

7. The system according to claim 6, wherein the position determiner is configured to determine said position of the system without correcting the reception time of the time information of each of the three or more satellites received by one or more of the two or more antenna-receiver combinations.

8. The system according to claim 6, wherein the position determiner is configured to determine said position of the system by correcting a reception time of the time information of each of the three or more satellites received by one or more of the two or more antenna-receiver combinations.

9. The system according to claim 8, wherein the position determiner is configured to correct said reception time of the time information of each of the three or more satellites received by said one or more of the two or more antenna-receiver combinations by using a geometry between the antennas of the two or more antenna-receiver combinations, or by using the antennas of the two or more antenna-receiver combinations with a position fix, or by using additionally an inertial navigation system and magnetic field sensors.

10. The system according to claim 1, wherein the receiver of each antenna-receiver combination of the two or more antenna-receiver combinations is configured to provide information about tracking parameters for carrier and code loops for one or more satellites of the three or more satellites to at least one other antenna-receiver combination of the two or more antenna-receiver combinations.

11. The system according to claim 10,
wherein the position of the system which is to be determined by the position determiner is a system position,
wherein the receiver of said antenna-receiver combination is configured to transform said information about the tracking parameters for the carrier and the code loops for said one or more satellites geometrically to an antenna position of the antenna of said at least one other antenna-receiver combination, and
wherein the receivers of said at least one other antenna-receiver combination are configured to use said information about the tracking parameters for the carrier and the code loops for a deep coupling of the tracking loops of said receiver of said at least one other antenna-receiver combination.

12. A motor vehicle, comprising the system according to claim 1.

13. The motor vehicle according to claim 12, wherein the motor vehicle is a harvester.

14. A method, wherein each of two or more antenna-receiver combinations includes an antenna and a receiver, and the receivers of the two or more antenna-receiver combinations being phase stable synchronized by a base reference clock, comprising:
determining a time of reception of time information from each satellite of three or more satellites by each antenna-receiver combination of the two or more antenna-receiver combinations, if the antenna of each of the two or more antenna-receiver combinations has a line of sight to each of the three or more satellites, and
determining a position of the system by a position determiner, if, for each of the three or more satellites, the position determiner receives the time information of each satellite from at least one of the two or more antenna-receiver combinations, depending on (i) a satellite position of each of the three or more satellites, (ii) how the antennas of the two or more antenna-receiver combinations are arranged in a predetermined geometry, (iii) the time information from each of the three or more satellites provided by the one of the two or more antenna-receiver combinations, (iv) the time of reception of the time information from the satellite by the position determiner, and (v) the orientation of the system, the orientation depending on how the antennas are arranged in the system and how an arrangement of the antennas is oriented with respect to a reference.

15. A non-transitory computer readable medium including a computer program for implementing the method of claim 14 when being executed on a computer or signal processor.

* * * * *